US012708167B2

(12) United States Patent
Zhou et al.

(10) Patent No.: US 12,708,167 B2
(45) Date of Patent: Aug. 18, 2026

(54) METHOD FOR PREPARING AN ENHANCED AUXETIC COMPOSITE MATERIAL (EACM)

(71) Applicant: HONEYWELL SAFETY PRODUCTS USA, INC., Charlotte, NC (US)

(72) Inventors: Shiqing Zhou, Shanghai (CN); Weiwei Ding, Charlotte, NC (US); Rui Luo, Shanghai (CN)

(73) Assignee: Honeywell Safety Products USA, Inc., Latham, NY (US)

( * ) Notice: Subject to any disclaimer, the term of this patent is extended or adjusted under 35 U.S.C. 154(b) by 0 days.

(21) Appl. No.: 18/664,099

(22) Filed: May 14, 2024

(65) Prior Publication Data

US 2024/0298732 A1 Sep. 12, 2024

Related U.S. Application Data

(62) Division of application No. 16/639,948, filed as application No. PCT/CN2017/098996 on Aug. 25, 2017, now abandoned.

(51) Int. Cl.
*B29C 43/18* (2006.01)
*A41D 19/015* (2006.01)
(Continued)

(52) U.S. Cl.
CPC ........ *A42B 3/125* (2013.01); *A41D 19/01517* (2013.01); *B29C 43/003* (2013.01);
(Continued)

(58) Field of Classification Search
CPC ... B29C 43/003; B29C 45/0001; B29C 65/40; B29C 64/40; B29C 70/443
See application file for complete search history.

(56) References Cited

U.S. PATENT DOCUMENTS 8,728,369 B2 5/2014 Alberg et al.
8,856,971 B2 10/2014 Green et al.
(Continued)

FOREIGN PATENT DOCUMENTS

CN 102245707 A 11/2011
CN 102686380 A 9/2012
(Continued)

OTHER PUBLICATIONS

Advisory Action (PTOL-303) Mailed on Feb. 14, 2023 for U.S. Appl. No. 16/639,948.
(Continued)

*Primary Examiner* — Edmund H Lee
(74) *Attorney, Agent, or Firm* — Fredrikson & Byron, P.A.

(57) ABSTRACT

Apparatus and associated methods relate to an enhanced auxetic composite material (EACM) of a base thermoplastic elastomer (TPE) and/or a thermoset material combined with an auxetic material, the composite formed with a molding process, where the base material is injected or dripped into or injected, dripped or formed around the auxetic material, the composite material providing higher impact performance than the individual materials. In an illustrative example, combining various energy absorbing materials with auxetic materials may further enhance impact performance. In some examples, TPE material injected into auxetic structures may fill internal voids. In some examples, the auxetic material may be suspended within the TPE material and be encapsulated around the auxetic material form. Auxetic materials may take various forms, for example, sheets, 3-D structures, and particles, each providing unique benefits. Various embodiments included within various personal protection articles may advantageously provide long life and enhance impact resistance.

16 Claims, 6 Drawing Sheets

(51) Int. Cl.

| | |
|---|---|
| ***A42B 3/12*** | (2006.01) |
| ***B29C 43/00*** | (2006.01) |
| ***B29C 43/02*** | (2006.01) |
| ***B29C 43/34*** | (2006.01) |
| ***B29C 45/00*** | (2006.01) |
| ***B29C 45/13*** | (2006.01) |
| ***B29C 45/16*** | (2006.01) |
| ***B29C 45/18*** | (2006.01) |
| ***B29C 45/56*** | (2006.01) |
| ***B29C 65/40*** | (2006.01) |
| ***B29C 70/44*** | (2006.01) |
| ***B29C 70/48*** | (2006.01) |
| *B29K 21/00* | (2006.01) |
| *B29K 101/12* | (2006.01) |
| *B29K 105/00* | (2006.01) |
| *B29K 501/12* | (2006.01) |
| *B29L 31/48* | (2006.01) |

(52) U.S. Cl.

CPC .............. *B29C 43/02* (2013.01); *B29C 43/18* (2013.01); *B29C 43/34* (2013.01); *B29C 45/0001* (2013.01); *B29C 45/13* (2013.01); *B29C 45/1676* (2013.01); *B29C 45/1866* (2013.01); *B29C 45/561* (2013.01); *B29C 65/40* (2013.01); *B29C 70/443* (2013.01); *B29C 70/48* (2013.01); *B29C 2043/189* (2013.01); *B29C 2043/3444* (2013.01); *B29K 2021/003* (2013.01); *B29K 2101/12* (2013.01); *B29K 2105/0067* (2013.01); *B29K 2501/12* (2013.01); *B29L 2031/4864* (2013.01)

(56) References Cited

U.S. PATENT DOCUMENTS

| | | | |
|---|---|---|---|
| 9,249,274 | B2 | 2/2016 | Bruno et al. |
| 9,538,798 | B2 | 1/2017 | Toronjo |
| 2010/0221521 | A1 | 9/2010 | Wagner et al. |
| 2011/0064909 | A1 | 3/2011 | Alderson et al. |
| 2011/0156314 | A1 | 6/2011 | Alberg et al. |
| 2012/0142239 | A1 | 6/2012 | Budden et al. |
| 2013/0171409 | A1 | 7/2013 | Meli et al. |
| 2014/0101816 | A1 | 4/2014 | Toronjo |
| 2020/0245710 | A1 | 8/2020 | Zhou et al. |

FOREIGN PATENT DOCUMENTS

| | | | |
|---|---|---|---|
| EP | 1612108 | B1 | 2/2008 |
| WO | 91/01210 | A1 | 2/1991 |
| WO | 2007/135447 | A1 | 11/2007 |
| WO | WO2007135447 | * | 11/2007 |
| WO | 2012/171911 | A1 | 12/2012 |

OTHER PUBLICATIONS

Advisory Action (PTOL-303) Mailed on Jan. 24, 2024 for U.S. Appl. No. 16/639,948, 4 page(s).

CA Notice of Allowance Mailed on Mar. 16, 2023 for CA Application No. 3073338, 1 page(s).

CA Office Action Mailed on Apr. 15, 2021 for CA Application No. 3073338, 4 pages.

CA Office Action Mailed on Jul. 19, 2022 for CA Application No. 3073338, 3 pages.

CA Office Action Mailed on Nov. 16, 2021 for CA Application No. 3073338, 3 pages.

Decision to grant a European patent received for European Application No. 17922206.2, mailed on Apr. 14, 2022, 2 pages.

European search opinion Mailed on Feb. 23, 2021 for EP Application No. 17922206.

Final Office Action Mailed on Nov. 29, 2022 for U.S. Appl. No. 16/639,948.

Final Rejection Mailed on Oct. 23, 2023 for U.S. Appl. No. 16/639,948, 8 page(s).

Intention to grant Mailed on Dec. 23, 2021 for EP Application No. 17922206, 29 pages.

International Search Report of the International Searching Authority for PCT/CN2017/098996 with mailing date of Jun. 8, 2018.

International Searching Authority, Written Opinion for Application No. PCT/CN2017/098996, Jun. 8, 2018, State Intellectual Property Office of the P.R. China, 3 pages.

Non-Final Office Action received for U.S. Appl. No. 16/639,948, mailed on May 26, 2022, 8 pages.

Non-Final Rejection Mailed on Apr. 12, 2023 for U.S. Appl. No. 16/639,948, 9 page(s).

Non-Final Rejection Mailed on Feb. 15, 2024 for U.S. Appl. No. 16/639,948, 8 page(s).

Supplementary European search report Mailed on Feb. 23, 2021 for EP Application No. 17922206.

* cited by examiner

METHOD FOR PREPARING AN ENHANCED AUXETIC COMPOSITE MATERIAL (EACM)

CROSS-REFERENCE TO RELATED APPLICATIONS

This patent application is a divisional of U.S. patent application Ser. No. 16/639,948, filed Feb. 18, 2020, now Abandoned, which is a National Stage Application, filed under 35 U.S.C. § 371, of International Application No. PCT/CN2017/098996, filed Aug. 25, 2017, each of which is incorporated herein by reference in its entirety.

TECHNICAL FIELD

Various embodiments relate generally to impact resistant materials used in personal safety equipment.

BACKGROUND

Fabrics are employed throughout the world for various purposes. For example, many fabrics are used to manufacture a wide variety of clothing. In some instances, fabrics are used to manufacture various bags, sacks, bed sheets, towels. Fabrics may even be used in the making of currency. Basic fabrics may include natural or synthetic fibers. For instance, natural fibers may include cotton, linen, wool and silk. Synthetic fibers may include polyester, acrylic and nylon.

Auxetic structures may be employed to produce auxetic material. Auxetic material may exhibit unusual behavior when stretched. Most materials when stretched become thinner. However, auxetic materials, with their negative Poisson's ratio, become thicker in response to applied stretching forces. This thickening phenomenon is due to the way the auxetic structure deforms in response to lateral stretching. Auxetic material has been employed in various products to provide various advantages. For example, auxetic material may be used in bandages with impregnated medicine. The medicine may be released as the bandage is stretched around the wound. As the wound swelling subsides, the material may be under less tension, and may hold the medicine within the bandage.

SUMMARY

Apparatus and associated methods relate to an enhanced auxetic composite material (EACM) of a base thermoplastic elastomer (TPE) and/or a thermoset material combined with an auxetic material, the composite formed with a molding process, where the base material is injected or dripped into or injected, dripped or formed around the auxetic material, the composite material providing higher impact performance than the individual materials. In an illustrative example, combining various energy absorbing materials with auxetic materials may further enhance impact performance. In some examples, TPE material injected into auxetic structures may fill internal voids. In some examples, the auxetic material may be suspended within the TPE material and be encapsulated around the auxetic material form. Auxetic materials may take various forms, for example, sheets, 3-D structures, and particles, each providing unique benefits. Various embodiments included within various personal protection articles may advantageously provide long life and enhance impact resistance.

Various embodiments may achieve one or more advantages. For example, various instances of personal protection equipment (e.g., gloves, shoes, helmets, knee and elbow-pads) may include integrated EACMs. Wearers of such personal protection equipment (PPEs) may be provided substantial protection from various impacts. Persons working with high vibrational equipment or vehicles, with EACM gloves, may be provided attenuated transfer of vibrational energy due to the energy absorption of the various EACM materials, thereby reducing fatigue and increasing comfort.

The details of various embodiments are set forth in the accompanying drawings and the description below. Other features and advantages will be apparent from the description and drawings, and from the claims.

DETAILED DESCRIPTION OF ILLUSTRATIVE EMBODIMENTS

To aid understanding, this document is organized as follows. First, the fabrication of an exemplary enhanced auxetic composite material (EACM) and the composition and structure are briefly introduced with reference to FIG. 1A. Second, with reference to 1B, various composite embodiments are illustrated. Next, with reference to FIG. 2, the impact resistance of an exemplary EACM is depicted in an illustrative use case. Next, with reference to FIG. 3, various exemplary auxetic filler-material embodiments in various formats are presented. Finally, in FIGS. 4 and 5, the discussion turns to exemplary embodiments that illustrate locations of EACM employment within various personal safety articles.

Figure 1A:
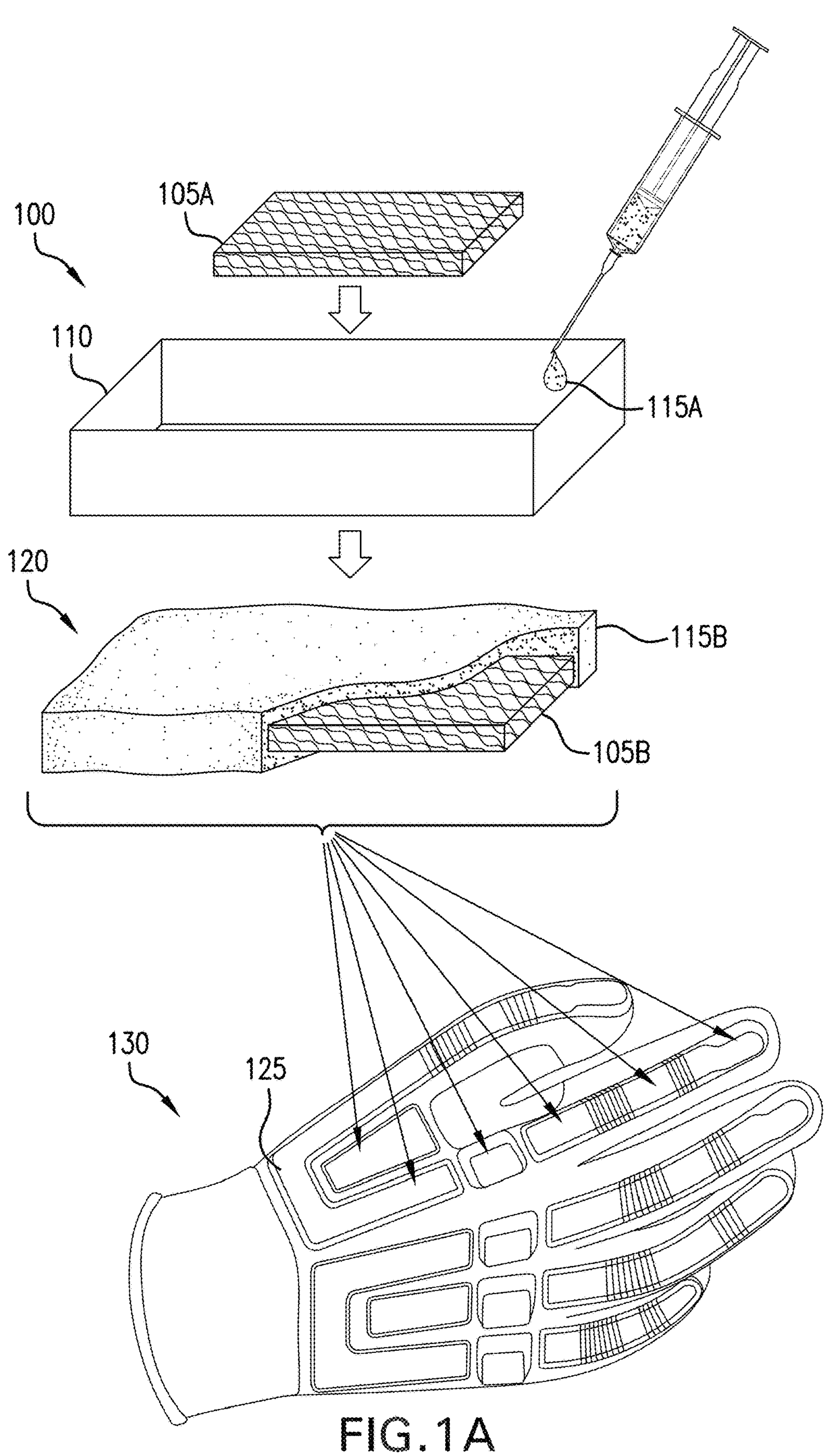
FIG. 1A depicts a perspective view of an exemplary enhanced auxetic composite material (EACM) implemented within a glove.

FIG. 1A depicts a perspective view of an exemplary enhanced auxetic composite material (EACM) implemented within a glove. A fabrication and implementation illustration 100 includes a sheet of auxetic material 105A. The auxetic material 105A is placed into a mold 110. The mold 110 is filled with a thermoplastic elastomer (TPE) 115A, for example, thermoplastic rubber (TPR), in a molten or semi-molten state. The auxetic material 105A in a solid state is immersed in the thermoplastic elastomer 115A in a molten or semi-molten state, within the mold 110. Once the thermoplastic elastomer 115A is allowed to cure, an EACM 120 results. The EACM 120 is a thermoplastic elastomer 115B with an included auxetic sheet 105B. The EACM 120 is then cut to fit various pouch sections 125 within a work glove 130. In some instances, the EACM 120 may be die-cut to fit the various padded pouch sections 125.

In various examples, the EACM 120 includes the thermoplastic elastomer 115B and the auxetic sheet 105B, where the thermoplastic elastomer 115B in a semi-molten or molten state is injected into the auxetic sheet 105B, substantially filling the gaps within a structure making up the auxetic sheet 105. In some examples, the thermoplastic elastomer 115B in a semi-molten or molten state is injected around the auxetic sheet 105B. In some embodiments, the thermoplastic elastomer 115B in a semi-molten or molten state is injected into and around the auxetic sheet 105B. The combination of the thermoplastic elastomer 115B and the auxetic sheet 105B may substantially enhance impact performance of the individual materials, the auxetic sheet 105B and the thermoplastic elastomer 115B.

An Exemplary Process for a Molded EACM:

1) Place a selected auxetic material in a solid state into a mold.
2) Place a pre-determined portion of TPR into the mold.
3) Apply pre-determined temperature/time profile.
4) Extract the final product(s) out of the mold.

An Exemplary Process for a Molded EACM:

1) Place a selected auxetic material in a solid state into a mold.
2) Dispense a pre-determined portion of TPR into the mold.
3) Apply pre-determined temperature/time profile.
4) Extract the final product(s) out of the mold.

An Exemplary Process for a Molded EACM:

1) Place a selected auxetic material in a solid state into a mold.
2) Substantially saturate the auxetic material with molten or semi-molten TPR.
3) Place a pre-determined portion of molten or semi-molten TPR into the mold.
4) Apply pre-determined temperature/time profile.
5) Extract the final product(s) out of the mold.

An Exemplary Process for a Molded EACM:

1) Place a selected auxetic material in a solid state into a mold.
2) Substantially saturate the auxetic material with molten or semi-molten TPR.
3) Dispense a pre-determined portion of molten or semi-molten TPR into the mold.
4) Apply pre-determined temperature/time profile.
5) Extract the final product(s) out of the mold.

An Exemplary Process for a Liquid Injection Molding EACM:

1) Place the selected molten or semi-molten base material into a first inject cell of a liquid injection molding machine.
2) Place a molten or semi-molten auxetic material into a second inject cell of the liquid injection molding machine.
3) Inject the solution from the first and second cells into a main cell, according to molding structure design requirements.
4) Heat the molding at pre-determined temperature for a pre-determined time.
5) Extract the final product(s) out of the injection molding machine.

An Exemplary Process for a Compression Molded EACM:

1) Place a bottom TPR sheet into a compression tool.
2) Place auxetic particles into the compression tool.
3) Place a top TPR sheet into a compression tool.
4) Place the compression tool into the compression molding machine.
5) Operate the compression molding machine. Pre-determined variables may include: material thickness, temperature, compression force and/or compression time.
6) Extract the tool from the compression molding machine.
7) Extract the final product(s) out of the tool.

An Exemplary Process for a Compression Molded EACM:

1) Place a bottom TPR sheet into a compression tool.
2) Place an auxetic sheet into the compression tool.
3) Place a top TPR sheet into the compression tool.
4) Place the compression tool into the compression molding machine.
5) Operate the compression molding machine. Pre-determined variables may include: material thickness, temperature, compression force and/or compression time.
6) Extract the tool from the compression molding machine.
7) Extract the final product(s) out of the tool.

An Exemplary Process for a Resin Transfer Molded (RTM) EACM:

1) Place a bottom TPR sheet into an RTM tool.
2) Place an auxetic sheet into the RTM tool.
3) Place a top TPR sheet into the RTM tool.
4) Place the compression tool into the compression molding machine.
5) Operate the RTM machine, which may force resin (and/or glue) into the mold, between the sheets. Predetermined variables may include: material thickness, temperature, resin injection force and/or compression time.
6) Extract the tool from the RTM machine.
7) Extract the final product(s) out of the tool.

Figure 1B:
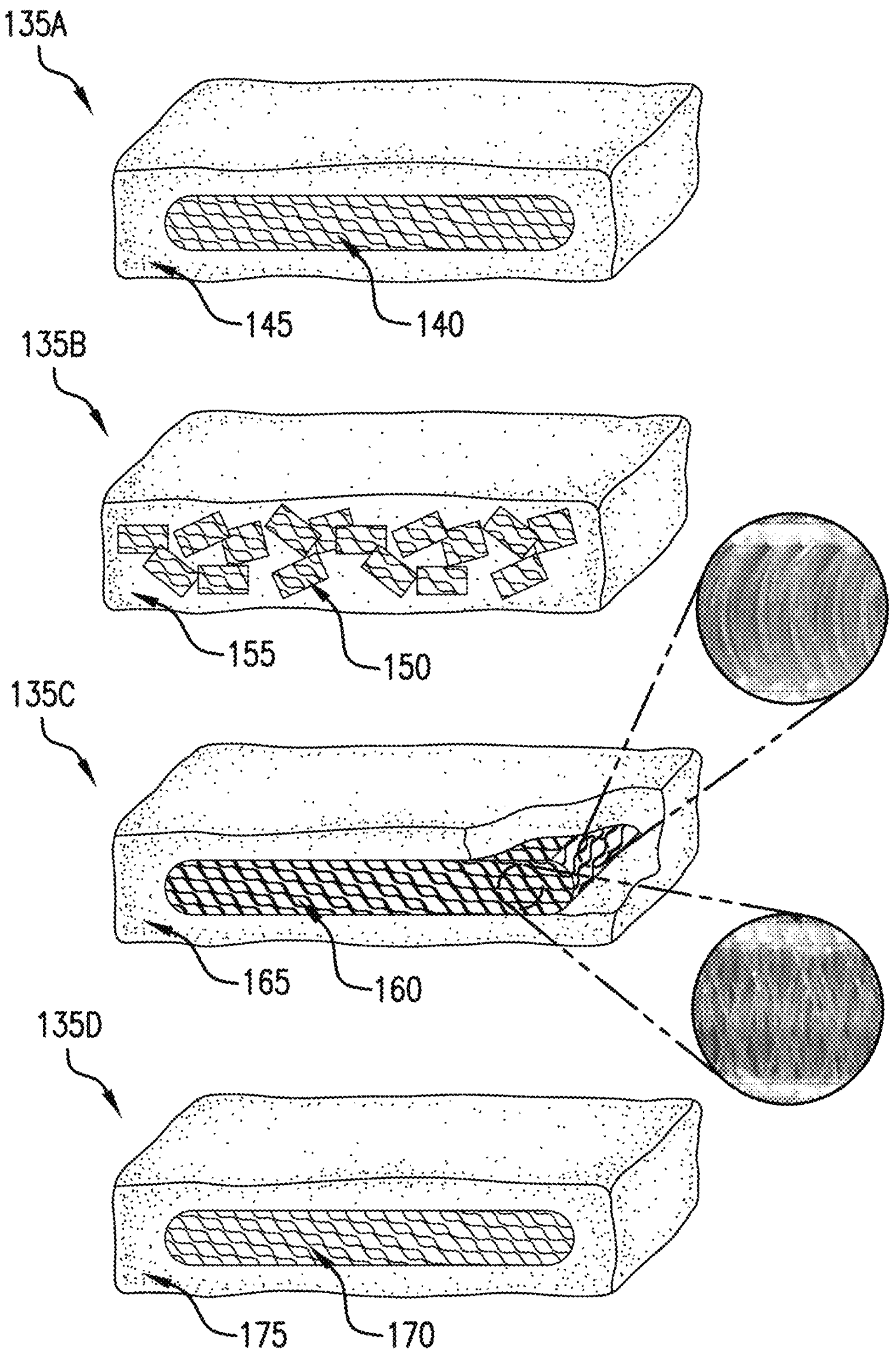
FIG. 1B depicts a perspective view of various exemplary EACMs illustrating encapsulation relationships between a base material and an auxetic material.

FIG. 1B depicts a perspective view of various exemplary EACMs illustrating encapsulation relationships between a base material and an auxetic material. An EACM 135A includes an auxetic sheet material 140, and a base material 145 (e.g., thermoplastic rubber (TPR)). In this example, the base material 145 may be initially molten or semi-molten, and the auxetic sheet material 140 may be solid, having the consistency of foam rubber. As such, as the base material 145 is molded around the auxetic sheet material 140, the base material 145 may not substantially ingress into the auxetic sheet material 140. The result may be the base material 145 surrounding the auxetic sheet material 140.

An EACM 135B includes an auxetic particle material 150, and a base material 155 (e.g., Ethylene-Butylene-Styrene (SEBS)). In this example, the base material 155 may be initially molten or semi-molten, and the auxetic particle material 150 may have the consistency of foam rubber. As such, as the base material 155 is molded around the auxetic particle material 150, the base material 155 may not substantially ingress into the auxetic particle material 150, but may fill the gaps between the individual particles within the particle material 150. The result may be the base material 155 surrounding the auxetic particle material 150 in a substantially uniform dispersion.

An EACM 135C includes an auxetic 3-D structure material 160, and a base material 165 (e.g., thermoplastic urethane (TPU)). In this example, the base material 165 may be initially molten or semi-molten. In this example, as the base material 165 is molded around the auxetic 3-D structure material 160, the base material 165 may not substantially ingress into the 3-D structure material 160. The result may be the base material 165 surrounding the 3-D structure material 160.

An EACM 135D includes an auxetic 3-D structure material 170, and a base material 175 (e.g., silicon rubber, polyvinyl chloride (PVC)). In this example, the base material 175 may be initially molten or semi-molten. In this example, as the base material 175 is molded over the auxetic 3-D structure material 170, the base material 175 may substantially ingress into the auxetic 3-D structure material 170, substantially filling the gaps within the 3-D structure material 170. The result may be the base material 175 surrounding and impregnating the auxetic 3-D structure material 170.

In some embodiments, the EACMs 135A, 135B, 135C and 135D may include a foamed TPR. The foamed TPR base material 145, 155, 165 and 175 may provide additional energy absorption, providing an even higher degree of impact protection to the user. In various examples, other base materials described may be foamed to produce the higher degree of impact protection.

In some examples, the molding process may include injection molding or vacuum injection molding, which may advantageously fill voids reliably. In some examples, a pressure molding process may be employed. Employment of pressure molding may allow sheets of base material and sheets of auxetic material to be pressure molded together producing a sandwich-style EACM result.

Various examples of the EACM (e.g., 135A, 135B, 135C and 135D) may substantially enhance impact performance of the individual materials (e.g., 140, 145, 150, 155, 160, 165, 170, 175).

Figure 2:
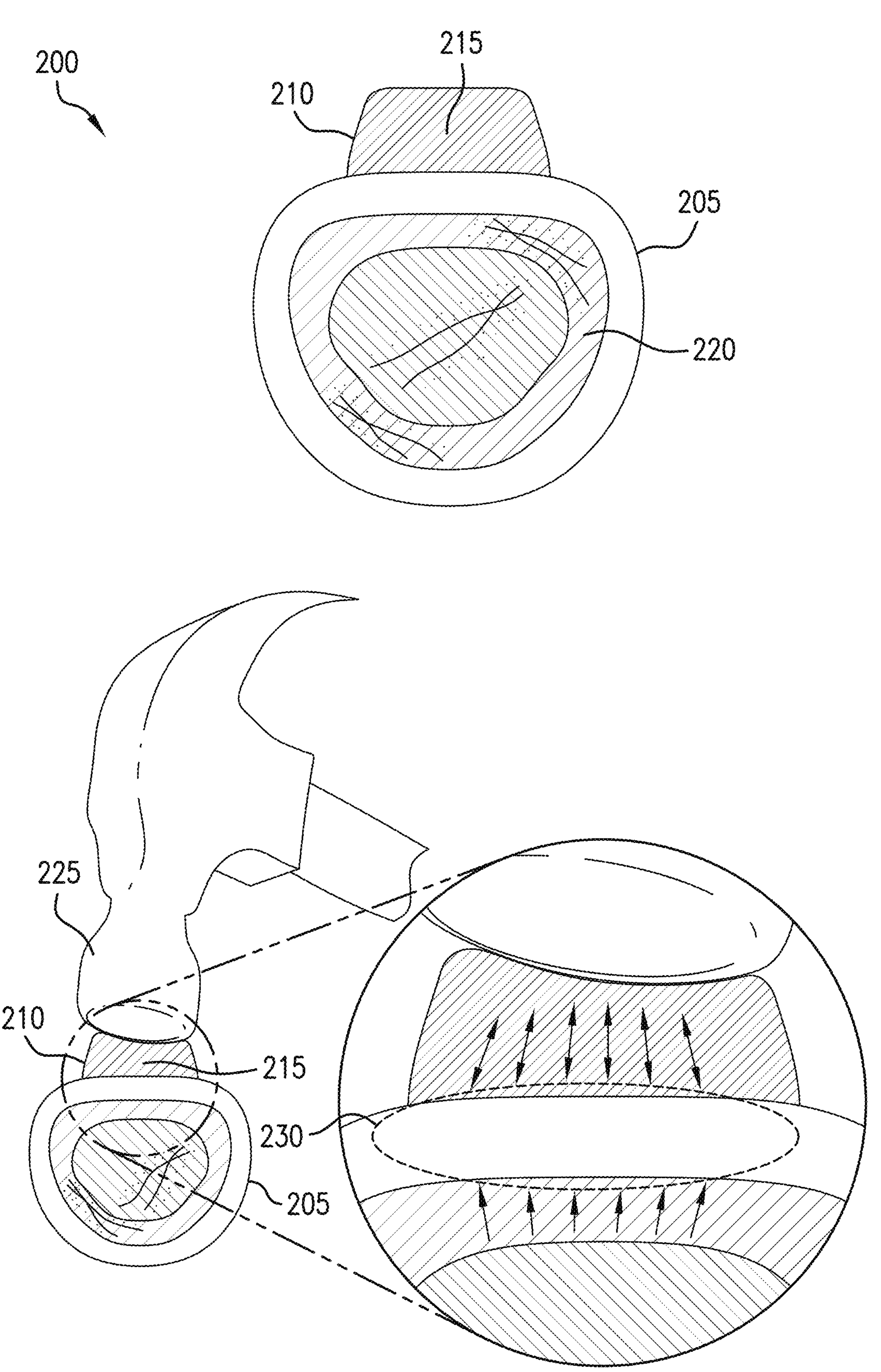
FIG. 2 depicts perspective views of an exemplary EACM illustrating its impact resistance.

FIG. 2 depicts perspective views of an exemplary EACM illustrating its impact resistance. A protection use case 200 includes a glove 205. A pouch section 210 is fixedly coupled to the glove 205. The pouch section 210 includes a sheet of EACM 215. The glove 205, shown in cross-section, is proximate to a user finger 220 also shown in cross-section. In some examples, the sheet of EACM 215 may be referred to as a filler material.

In operation, when an object 225 strikes the glove 205, specifically on the pouch sections 210 containing the sheet of EACM 215, the EACM 215 shortens in height in response to the impact. Due to its auxetic nature, the internal structure of the EACM 215 consolidates, reflecting some of the impact back to the object 225. During this consolidation and reflection, the energy of the energy from the impact is also dispersed over a wider surface 230, reducing the impact concentration. In addition, due to the inclusion of a thermoplastic elastomer (e.g., FIG. 1A, item 115) within the EACM 215, substantial energy absorbing characteristics, may take place. The EACM 215 composed of a base material (e.g., TPR) with auxetic material may advantageously enhance an impact performance of the composite EACM 215 material.

Figure 3:
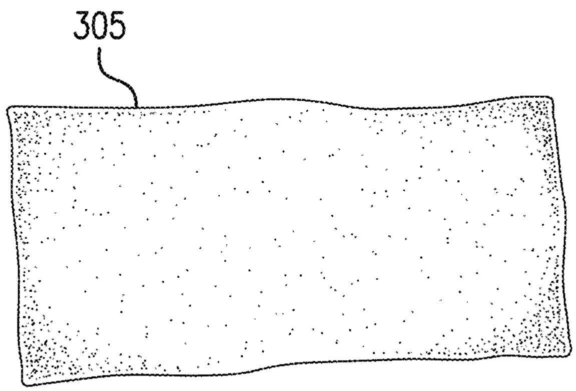
FIG. 3 depicts a perspective view of various exemplary auxetic filler materials within an EACM.
Figure 3:
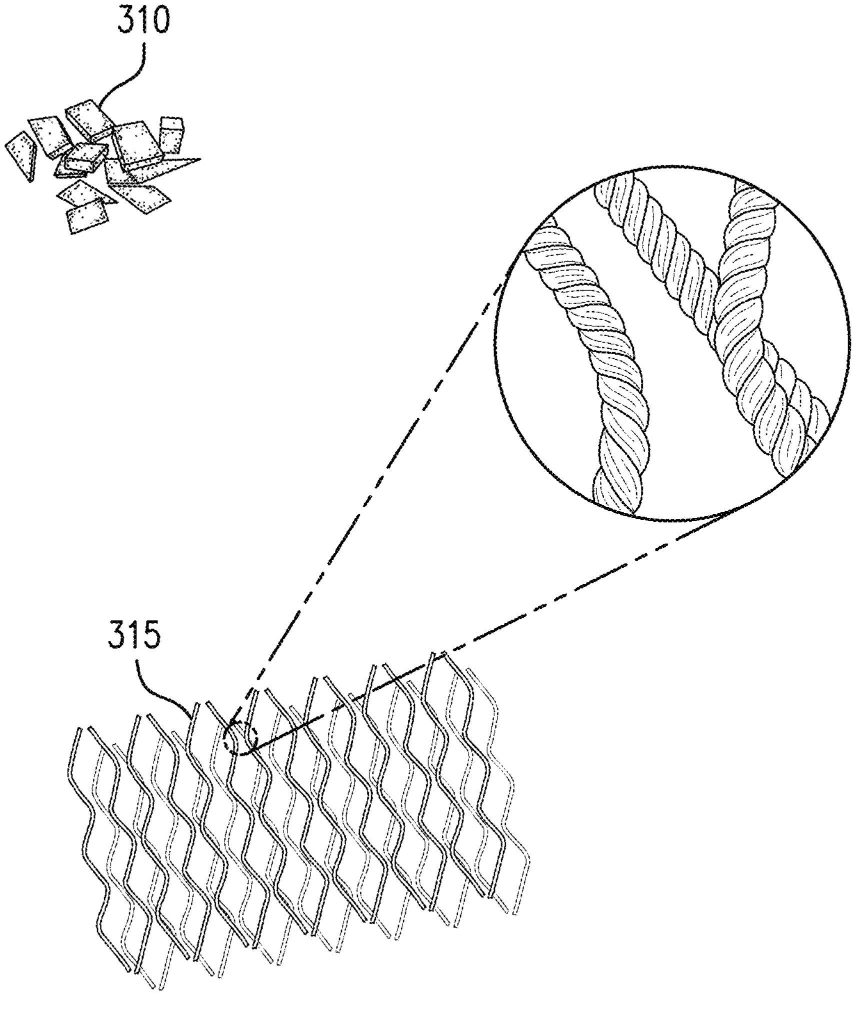

FIG. 3 depicts a perspective view of various exemplary auxetic filler materials within an EACM. FIG. 3 includes an auxetic sheet 305. Next, FIG. 3 includes auxetic particles 310. The auxetic particles may be small chunks of the auxetic sheet 305. Finally, FIG. 3 illustrates an auxetic material in the form of a 3-D structure 315. The 3-D structure 315 may include substantial open space (voids) within the structure. The voids within the 3-D structure 315 may be suitable for liquid injection molding of a base material. Various examples of EACMs composed of a base material with various forms of auxetic material, for example, sheets 305, particles 310, and 3-D structures 315 may advantageously enhance an impact performance of a resulting composite EACM material.

Figure 4:
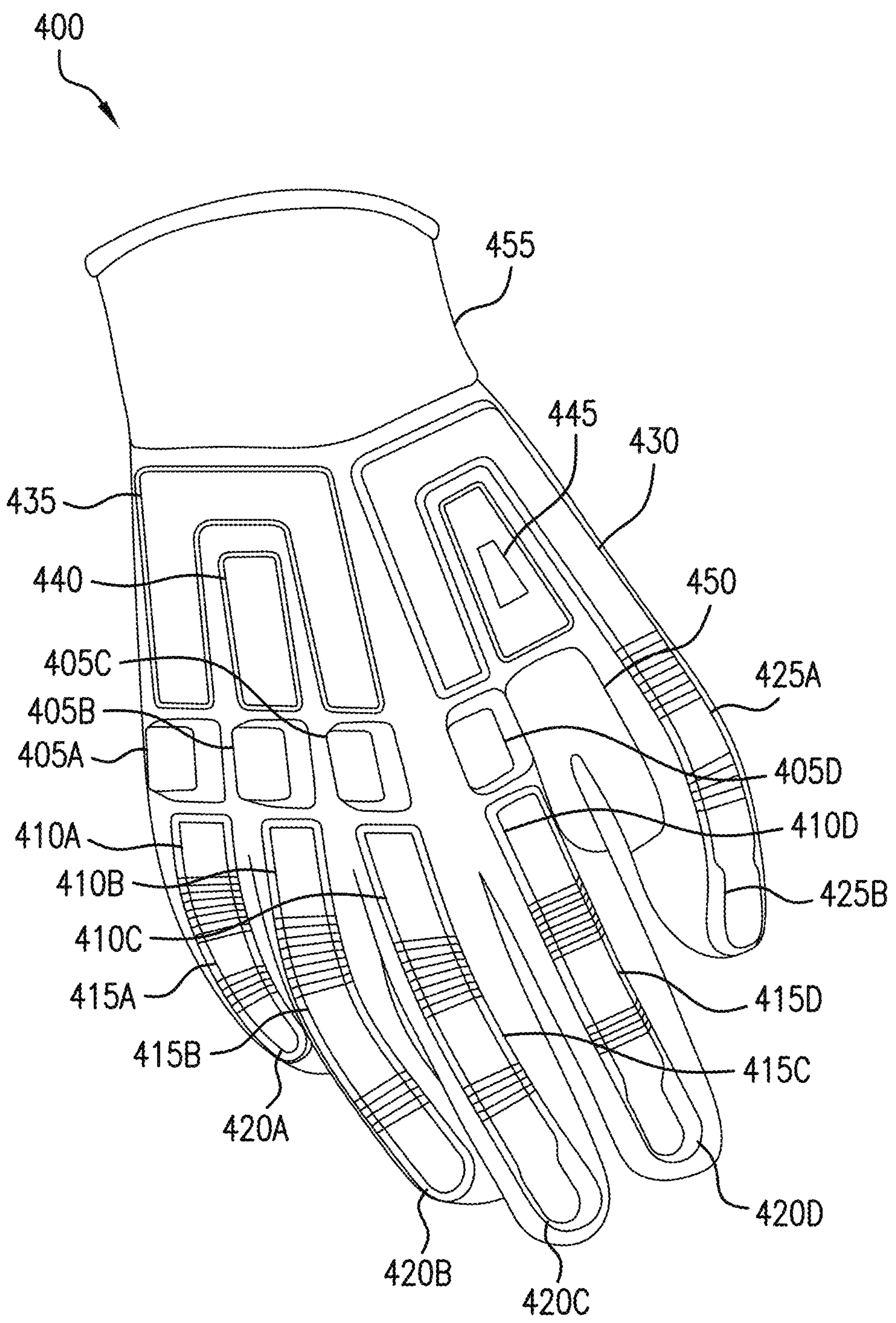
FIG. 4 depicts an exemplary glove, illustrating various implementation locations of EACM.

FIG. 4 depicts an exemplary glove, illustrating various implementation locations of EACMs. An exemplary glove 400 includes a little knuckle pad 405A, a ring knuckle pad 405B, a middle knuckle pad 405C and an index knuckle pad 405D. The exemplary glove 400 includes a little proximal pad 410A, a ring proximal pad 410B, a middle proximal pad 410C and an index proximal pad 410D. The exemplary glove 400 includes a little intermediate pad 415A, a ring intermediate pad 415B, a middle intermediate pad 415C and an index intermediate pad 415D. The exemplary glove 400 includes a little distal pad 420A, a ring distal pad 420B, a middle distal pad 420C and an index distal pad 420D.

The exemplary glove 400 includes a thumb proximal pad 425A and a thumb distal pad 425B. The exemplary glove 400 includes a thumb-index metacarpal pad 430. The exemplary glove 400 includes a middle-little metacarpal pad 435. The exemplary glove 400 includes a ring metacarpal pad 440. The exemplary glove 400 includes a first dorsal interosseous pad 445. The exemplary glove 400 includes a first dorsal interosseous reinforcement 450. Finally, the exemplary glove 400 includes a wrist sleeve 455.

The glove 400 may include various embodiments of the EACMs (e.g., FIG. 1B, items 135A, 135B, 135C and 135D) within the identified pads (e.g., 405A, 405B, 405C, 405D, 410A, 410B, 410C, 410D, 415A, 415B, 415C, 415D, 420A, 420B, 420C, 420D, 425A, 425B, 430, 435, 440, 445). These EACM inclusions may substantially enhance impact performance of the individual materials. In various examples, personal safety articles (e.g., jackets, knee-pads, elbow-pads) with integrated EACMs may protect the wearer (user) from cuts, impacts, and vibrations.

Figure 5:
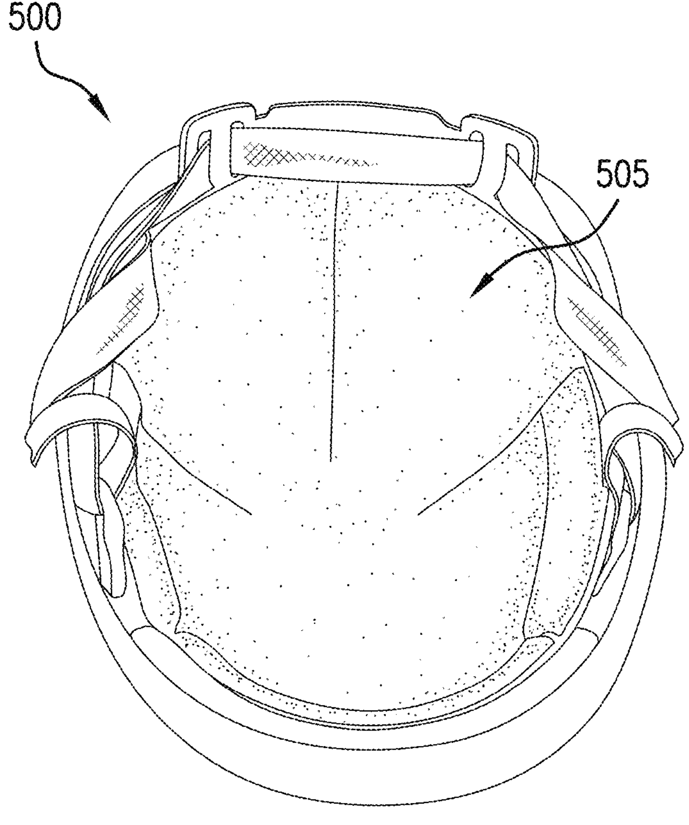
FIG. 5 depicts an exemplary helmet, illustrating various implementation locations of EACM.

FIG. 5 depicts an exemplary helmet, illustrating various implementation locations of EACM. A helmet 500, includes a cushioning material 505. The cushioning material 505 is included within the interior of the helmet 500. When the helmet 500 is worn on the head of a user, the cushioning material 505 is located between the helmet 500 and the user's head. The cushioning material 505 may include one or more of the various embodiments of the EACMs (e.g., FIG. 1B, items 135A, 135B, 135C and 135D). These inclusions may substantially enhance impact performance of the individual materials. In various examples, the EACM may provide substantial comfort due to the energy dissipation nature of the EACM composite material.

Although various embodiments have been described with reference to the figures, other embodiments are possible. For example, the EACM may be composed of two materials, a first material and a second material. In some examples, the first material may be thermoplastic rubber (TPR), which may advantageously provide flexibility and energy absorption from various impacts. In some embodiments, the first material may be Styrene-ethylene-butylene-styrene (SEBS), which may advantageously provide substantial weather resistance and heat resistance. In various examples, the first material may be thermoplastic urethane (TPU), which may advantageously provide exceptional performance in cold temperatures, and resistance to water and various petroleum products. In some examples, the first material may be polyvinyl chloride (PVC), which may advantageously mix well with other substances, and may retard microbial growth, as well as provide impact resistance. In various embodiments, the first material may be silicon rubber, which may advantageously provide heat resistance, resistance to cold temperatures and electrical insulation. In various embodiments, the first material may be thermoset, which may advantageously provide high strength and durability.

In various embodiments, the first material may be a mixture which includes a shear thickening material. In some examples of the shear thickening material may be liquid. In some embodiments, the shear thickening material may be solid.

In various embodiments, the auxetic material may be composed of crystalline cellulose. In some examples, the auxetic material may be composed of molecular-level polymers.

In some examples, the auxetic material may be composed of microporous polymer and/or fibers. Such examples may include cylinders and plaques. Various processes may be employed for fabrication, for example, powder compaction sintering and extrusion.

In various examples, the auxetic material may be composed of a liquid crystalline polymer, which may advantageously resist melting at high temperatures.

Various examples of the auxetic material may be implemented in a sandwich structure, for example, an angle-ply laminate, an auxetic textile reinforcement and/or sandwich panels. Various processes may be employed to fabricate the sandwich structures, for example, pre-preg, hand layup and vacuum bagging.

In some examples, the auxetic material may be in the form of auxetic monofilaments and/or films. Processes employed may include continuous melt extrusion, for example.

In various embodiments, the auxetic material may be provided in the form of auxetic honeycombs, which may be, for example, flat and curved panels. Various processes may be employed to fabricate auxetic honeycomb forms, for example, rapid prototyping, laser cutting and snap fitting.

In some examples, the auxetic material may be auxetic foams in various shapes and/or form factors, for example, cylinders and cuboids or flat and curved thin sheets. Various processes may be employed, for example, compression and heat treatment.

In various examples, the EACM may have multiple layers or pieces of auxetic material. For example, there may be multiple strips of auxetic material that are overlapping or crisscrossing. In some examples, the pieces of auxetic material may be parallel, orthogonal, acute, and/or obtuse with respect to one another. In some embodiments, the layers of auxetic material may be oriented in an interstitial pattern. In some examples, the layers of auxetic material may form interwoven strands. In some embodiments, the auxetic material may be arbitrarily shaped chucks of auxetic material (e.g., diced auxetic material).

The auxetic materials may take various exemplary forms, for example, sheets, 3-D structures, and particles, each providing unique benefits. For example, auxetic sheets may be pressure molded together with various base material. Auxetic 3-D structures may be impregnated more readily. Auxetic particles may provide manufacturers with substantial control over performance of the overall composite material, by allowing flexibility of portion control.

In an exemplary aspect, an enhanced auxetic composite material (EACM) may be prepared by a process comprising the steps of (1) providing a quantity of auxetic material, (2) providing a quantity of thermoplastic elastomer (TPE) material in a molten phase, (3) combining the quantity of auxetic material and the quantity of TPE material in a molten phase together in a mold, and (4) transitioning the TPE material to a solid phase to form the EACM.

The EACM preparation process may further include a predetermined mold shape, for example, a rectangular prism. The EACM preparation process may further include a predetermined mold shape sized to the dimensions and shape of a knuckle section of a glove, for example, as depicted in FIG. 4 items 405A, 405B, 405C, and 405D. The EACM preparation process may further include a predetermined mold shape sized to the dimensions and shape of a cushion section of a helmet. The EACM preparation process may further include a continuous unitary sheet of auxetic material. The EACM preparation process may further include a plurality of auxetic particles. The EACM preparation process may further include an auxetic 3-D structure material. The EACM preparation process may further include an auxetic material with a porous surface, wherein the TPE material in the molten phase ingresses into the porous surface when the auxetic material and TPE material are combined, such that the TPE material permeates the auxetic material to saturate the auxetic material with the TPE material. The EACM preparation process may include a mold of a compression molding machine.

The EACM preparation process may further include (1) placing the TPE material in a molten state into a first inject cell of a liquid injection molding machine, (2) placing the auxetic material in a molten or semi-molten state into a second inject cell of the liquid injection molding machine, and (3) injecting the TPE material in the first inject cell and the auxetic material in the second inject cell into the mold.

In an exemplary aspect, an enhanced auxetic composite material (EACM) may be prepared by a process comprising the steps of (1) providing a quantity of auxetic material, (2) providing a quantity of thermoplastic elastomer (TPE) material in a molten phase, (3) mixing the quantity of auxetic material and the quantity of TPE material together in a mold having a predetermined shape, and (4) transitioning the TPE material to a solid phase to form the EACM.

In some examples, the EACM may not be limited to auxetic materials. In such examples, various non-auxetic materials may be combined with the base material. For example, foam rubber sheets may advantageously provide high impact dampening performance. In some examples, polyethylene closed cell particles may be employed to provide high cushioning performance. Further, in some examples, polyurethane open cell 3D structures may be used to reduce vibration.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A method for preparing an enhanced auxetic composite material (EACM) comprising the steps of:
- providing a quantity of auxetic material, wherein the quantity of auxetic material comprises a continuous unitary sheet of auxetic material;
- providing a quantity of thermoplastic elastomer (TPE) material in a molten phase, wherein the quantity of TPE material comprises thermoplastic rubber (TPR);
- combining the quantity of auxetic material and the quantity of TPE material together in a mold having a predetermined shape; and
- transitioning the quantity of TPE material from the molten phase to a solid phase to form the EACM.

2. The method of claim 1, wherein the predetermined shape of the mold is a rectangular prism.

3. The method of claim 1, wherein the predetermined shape of the mold is sized to the dimensions and shape of a knuckle section of a glove.

4. The method of claim 1, wherein the predetermined shape of the mold is sized to the dimensions and shape of a cushion section of a helmet.

5. The method of claim 1, wherein the quantity of auxetic material further comprises a porous surface, and wherein the quantity of TPE material in the molten phase ingresses into the porous surface when the quantity of auxetic material and the quantity of TPE material are combined, such that the quantity of TPE material permeates the quantity of auxetic material to saturate the quantity of auxetic material with the quantity of TPE material.

6. The method of claim 1, wherein the mold comprises a mold of a compression molding machine.

7. The method of claim 1, further comprising cutting the EACM.

8. The method of claim 7, wherein the EACM is die-cut.

9. The method of claim 1, wherein combining the quantity of auxetic material and the quantity of TPE material together in the mold includes injecting the TPE material into the continuous unitary sheet of auxetic material.

10. The method of claim 1, wherein combining the quantity of auxetic material and the quantity of TPE material together in the mold includes injecting the TPE material around the continuous unitary sheet of auxetic material.

11. The method of claim 1, wherein combining the quantity of auxetic material and the quantity of TPE material together in the mold includes injecting the TPE material into and around the continuous unitary sheet of auxetic material.

12. The method of claim 1, wherein the auxetic material comprises crystalline cellulose.

13. The method of claim 1, wherein the auxetic material comprises molecular-level polymers.

14. The method of claim 1, wherein the auxetic material comprises microporous polymer and/or fibers.

15. The method of claim 1, wherein the auxetic material comprises a liquid crystalline polymer.

16. The method of claim 1, wherein the auxetic material comprises auxetic foam.

* * * * *